(12) United States Patent
Liu

(10) Patent No.: US 10,163,597 B2
(45) Date of Patent: Dec. 25, 2018

(54) ENERGY-SAVING GROUND-FAULT CIRCUIT INTERRUPTER

(71) Applicant: Shanghai Yunyuan Electric Appliance Co., Ltd., Shanghai (CN)

(72) Inventor: Guojiu Liu, Shanghai (CN)

(73) Assignee: SHANGHAI YUNYUAN ELECTRIC APPLIANCE CO., LTD., Shanghai (CN)

( * ) Notice: Subject to any disclaimer, the term of this patent is extended or adjusted under 35 U.S.C. 154(b) by 237 days.

(21) Appl. No.: 14/992,069

(22) Filed: Jan. 11, 2016

(65) Prior Publication Data

US 2017/0201087 A1 Jul. 13, 2017

(30) Foreign Application Priority Data

Jan. 8, 2016 (CN) .......................... 2016 1 0011729

(51) Int. Cl.
| | | |
|---|---|---|
| *H01H 71/28* | (2006.01) | |
| *H02H 3/16* | (2006.01) | |
| *H01H 83/14* | (2006.01) | |
| *H02H 3/33* | (2006.01) | |

(52) U.S. Cl.
CPC .......... *H01H 71/28* (2013.01); *H01H 83/144* (2013.01); *H02H 3/162* (2013.01); *H02H 3/33* (2013.01)

(58) Field of Classification Search
CPC .......... H02H 3/16–3/335; H02H 3/162; H02H 3/32–3/338; H01H 83/144; H01H 71/26–71/28

See application file for complete search history.

(56) References Cited

U.S. PATENT DOCUMENTS

| | | | | | |
|---|---|---|---|---|---|
| 5,420,740 | A | * | 5/1995 | MacKenzie | .............. H02H 1/04 361/113 |
| 5,459,630 | A | * | 10/1995 | MacKenzie | .......... H02H 1/0015 324/520 |
| 5,568,344 | A | * | 10/1996 | Gernhardt | .............. H01H 83/04 361/115 |
| 5,661,623 | A | * | 8/1997 | McDonald | ............. H01H 83/02 361/42 |
| 7,619,860 | B1 | * | 11/2009 | Finlay, Sr. | ............. H02H 3/338 361/42 |

(Continued)

*Primary Examiner* — Ronald W Leja
*Assistant Examiner* — Christopher Clark
(74) *Attorney, Agent, or Firm* — Yong Chen

(57) ABSTRACT

An energy-saving ground-fault circuit interrupter (GFCI) includes an electronic circuit board provided in a housing and a breaker switch mounted on and controlled by the electronic circuit board. The electronic circuit board includes a power circuit, a test circuit, a work indicator circuit, a leakage detection circuit, a neutral-line ground fault detection circuit, a silicon-controlled rectifier (SCR) circuit, and an integrated circuit. The GFCI is characterized by further including a dual-coil switch-closing circuit parallel-connected to the power circuit and is advantageous in that the breaker switch can be rapidly closed by simultaneously supplying electricity to both coils to effect strong electromagnetic attraction, is kept closed by only one of the coils after current to the other coil is cut off via the properties of capacitors, and when a circuit fault occurs, is opened via an SCR which renders the single working coil out of electricity to ensure safety.

4 Claims, 1 Drawing Sheet

(56) References Cited

U.S. PATENT DOCUMENTS

| | | | | |
|---|---|---|---|---|
| 7,751,161 B2* | 7/2010 | Williams | ............... | H01H 83/02 |
| | | | | 361/42 |
| 7,936,238 B1* | 5/2011 | Weeks | ................... | H01H 83/04 |
| | | | | 335/18 |
| 8,514,529 B1* | 8/2013 | McMahon | ............. | H02H 3/338 |
| | | | | 361/42 |
| 9,077,177 B2* | 7/2015 | Liu | ......................... | H02H 3/16 |
| 2006/0279886 A1* | 12/2006 | Huang | ................... | H01H 83/04 |
| | | | | 361/42 |
| 2013/0241675 A1* | 9/2013 | Simonin | ................ | H01H 50/44 |
| | | | | 335/6 |
| 2014/0268434 A1* | 9/2014 | Simonin | ............. | H02H 1/0092 |
| | | | | 361/42 |
| 2014/0278157 A1* | 9/2014 | Simonin | ................ | H02H 3/335 |
| | | | | 702/58 |
| 2016/0181785 A1* | 6/2016 | Simonin | ................ | H02H 3/335 |
| | | | | 361/94 |

\* cited by examiner

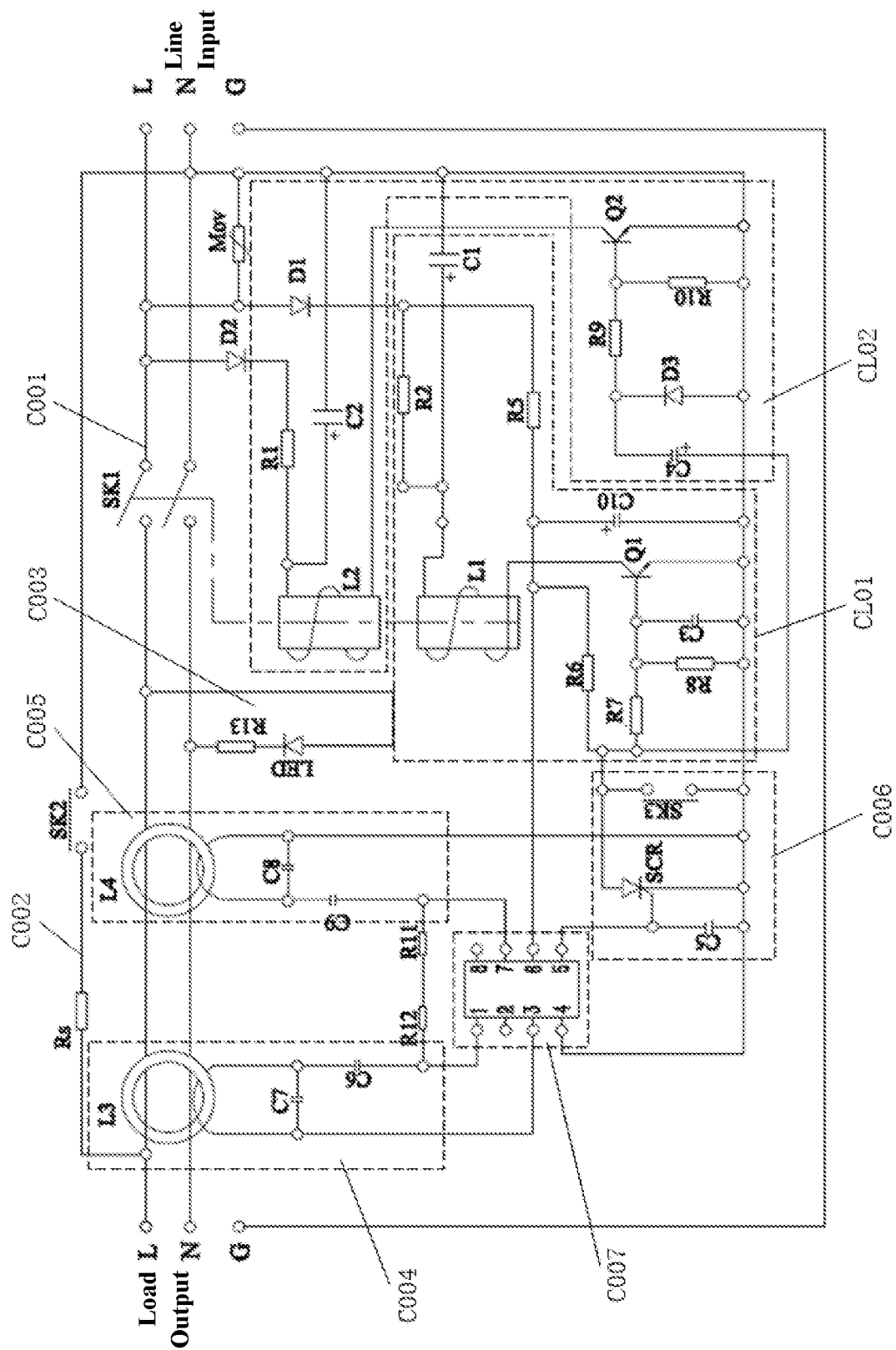

ENERGY-SAVING GROUND-FAULT CIRCUIT INTERRUPTER

CROSS REFERENCE TO RELATED APPLICATION

This application claims priority to Chinese Application No. 201610011729.8, filed Jan. 8, 2016, the disclosure of which is incorporated herein by reference in its entirety.

BACKGROUND

1. Technical Field

The present invention relates to the technical field of electrical appliance protection devices. More particularly, the present invention relates to an energy-saving ground-fault circuit interrupter which closes a breaker switch rapidly with two coils and then uses only one of the coils to keep the breaker switch closed.

2. Description of Related Art

Ground-fault circuit interrupters (GFCIs) are designed and manufactured in accordance with the requirements set forth in the US UL943 standard.

The solenoid relay in a conventional GFCI requires a high-voltage, high-power power supply mode. This mode, however, tends to bring the solenoid relay into a large-current, high-power state, in which the solenoid relay keeps generating heat and may burn as a result.

To overcome the shortcomings of the prior art, the inventor of the present invention designed a novel GFCI which opens and closes a breaker switch entirely under the control of an electronic circuit, and which is more energy-saving than its conventional counterparts.

SUMMARY OF THE INVENTION

To implement the afore-mentioned functions and overcome the shortcomings of the prior art, the present invention provides an energy-saving GFCI which incorporates the following technical solutions:

An energy-saving GFCI includes an electronic circuit board and a breaker switch mounted on and controlled by the electronic circuit board. The electronic circuit board is provided in a housing formed by hermetically connecting a base and a cover and is provided with the following circuits:

a power circuit composed at least of a neutral line N, a live line L, and a breaker switch SK1 series-connected to the neutral line N and the live line L;

a test circuit series-connected to the power circuit and composed at least of a test resistor Rs and a test push-button switch SK2 series-connected together;

a work indicator circuit series-connected to the power circuit and composed at least of a resistor R13 and a light-emitting diode (LED) light series-connected together;

a leakage detection circuit series-connected to the power circuit and composed at least of a leakage detection transformer L3, a capacitor C6, and a capacitor C7;

a neutral-line ground fault detection circuit series-connected to the power circuit and composed at least of a neutral-line ground fault detection transformer L4, a capacitor C8, and a capacitor C9;

a silicon-controlled-rectifier (SCR) trigger circuit composed at least of a capacitor C5, an SCR, and a trigger switch SK3; and an integrated circuit (IC) which is electrically connected to the leakage detection circuit and the neutral-line ground fault detection circuit in order to receive respectively therefrom a leakage fault signal and a ground fault signal, and which is also electrically connected to the SCR trigger circuit in order to send thereto a shaped leakage fault trigger signal and a shaped ground fault trigger signal.

The energy-saving GFCI is characterized by further including a dual-coil switch-closing circuit parallel-connected to the power circuit, wherein the dual-coil switch-closing circuit includes:

a first switch-closing circuit composed of a diode D1, a resistor R2, a capacitor C1, a coil L1, a triode Q1, a resistor R5, a resistor R6, a resistor R7, a resistor R8, a capacitor C3, and a capacitor C10; and a second switch-closing circuit parallel-connected to the first switch-closing circuit and composed of a diode D2, a resistor R1, a capacitor C2, a coil L2, a triode Q2, a resistor R9, a resistor R10, a diode D3, and a capacitor C4;

wherein the coils L1 and L2 have the same current direction so as to jointly generate a switch-closing electromagnetic force in the instant when they are supplied with electricity.

Once the diode D1 rectifies the current running therethrough, at least the following closed loops may be formed:

a first closed loop composed of the resistor R2 and the capacitor C1 (this closed loop will not be formed when the capacitor C1 is fully charged and therefore does not allow passage of current);

a second closed loop composed of the resistor R2, the coil L1, the triode Q1, the resistor R5, the resistor R6, the resistor R7, and the triode Q1 and serving to supply electricity to the coil L1 in order for the coil L1 to close the breaker switch SK1;

a third closed loop composed of the resistor R5 and the capacitor C10 (this closed loop will not be formed when the capacitor C10 is fully charged and therefore does not allow passage of current);

a fourth closed loop composed of the resistor R5, the resistor R6, and the trigger switch SK3, wherein the trigger switch SK3 remains open when there is no circuit fault or when the GFCI is supplied with electricity and in normal operation;

a fifth closed loop composed of the resistor R5, the resistor R6, the resistor R7, and the resistor R8;

a sixth closed loop composed of the resistor R5, the resistor R6, the resistor R7, and the capacitor C3 (this closed loop will not be formed when the capacitor C3 is fully charged and therefore does not allow passage of current);

a seventh closed loop composed of the resistor R5, the resistor R6, the capacitor C4, and the diode D3 (this closed loop will not be formed when the capacitor C4 is fully charged and therefore does not allow passage of current);

an eighth closed loop composed of the resistor R5, the resistor R6, the capacitor C4, the resistor R9, and the resistor R10 (this closed loop will not be formed when the capacitor C4 is fully charged and therefore does not allow passage of current); and a ninth closed loop composed of the resistor R5 and the resistor R6 in the first switch-closing circuit; the capacitor C4, the resistor R9, and the triode Q2 in the second switch-closing circuit; and the resistor R1, the coil L2, and the triode Q2 in the second switch-closing circuit.

In addition, once the diode D2 rectifies the current running therethrough, at least the following closed loops may be formed:

a tenth closed loop composed of the resistor R1 and the capacitor C2 (this closed loop will not be formed when the capacitor C2 is fully charged and therefore does not allow passage of current); and an eleventh closed loop composed of the resistor R1, the coil L2, and the triode Q2 in the second switch-closing circuit; the resistor R5 and the resistor R6 in the first switch-closing circuit; and the capacitor C4, the resistor R9, and the triode Q2 in the second switch-closing circuit and serving to supply electricity to the coil L2 in order for the coil L2 to close the breaker switch SK1.

When the capacitors C1, C2, C3, C4, and C10 are fully charged, the coil L1 is supplied with electricity and continues generating an electromagnetic field to keep the breaker switch SK1 closed, whereas the coil L2 is out of electricity and unable to close the breaker switch SK1 by electromagnetic attraction.

When one of the leakage detection circuit and the neutral-line ground fault detection circuit detects a circuit fault, the one detecting the circuit fault sends the fault signal to the IC instantly. The IC shapes the fault signal and sends the resulting trigger signal to the SCR trigger circuit. As a result, the trigger switch SK3 is triggered to close, causing the voltage value at the resistor R7 to approach zero rapidly. Once the triode Q1 is turned off, the coil L1 becomes out of electricity and is unable to close the breaker switch SK1 by electromagnetic attraction.

In the first switch-closing circuit and the second switch-closing circuit, the resistor R2 and the resistor R5 are parallel-connected to each other and series-connected to the diode D1;

the coil L1 and the triode Q1 are series-connected to each other and parallel-connected to the capacitor C1, and this parallel-connected unit is series-connected to the resistor R2;

the resistor R6 and the capacitor C10 are parallel-connected to each other and series-connected to the resistor R5;

the trigger switch SK3, the capacitor C4, and the resistor R7 are parallel-connected to one another and series-connected to the resistor R6;

the resistor R8, the capacitor C3, and the triode Q1 are parallel-connected to one another and series-connected to the resistor R7;

the resistor R1 is series-connected to the diode D2/M7;

the coil L2 and the triode Q2 are series-connected to each other and series-connected to the resistor R1;

the triode Q2 and the resistor R10 are parallel-connected to each other and series-connected to the resistor R9; and the resistor R9 and the diode D3 are parallel-connected to each other and series-connected to the capacitor C4.

The present invention is advantageous over the prior art in that, by supplying electricity to both coils simultaneously, a strong force of electromagnetic attraction is instantly generated to close the breaker switch rapidly; that after the breaker switch is closed, the current to one of the coils is cut off via the properties of capacitors, and electricity is supplied to only one coil to keep the breaker switch turned on; and that upon occurrence of a circuit fault, the SCR renders the single working coil out of electricity, so the breaker switch cuts off power supply to ensure safety.

BRIEF DESCRIPTION OF THE DRAWINGS

FIG. 1 is a schematic circuit diagram of the GFCI of the present invention.

DETAILED DESCRIPTION

To facilitate the understanding of the technical means, inventive features, objectives, and effects of the present invention, the invention is described in more detail below with reference to the accompanying drawing.

The GFCI of the present invention has two working positions, namely ON and OFF. When the GFCI is in the ON position, power supply is connected to the load; when the GFCI is in the OFF position, power supply is cut off from the load. The GFCI is configured to cut off the current in the wire between the power supply and the load when a leakage fault or ground fault takes place at the load end, with a view to ensuring both personal and equipment safety.

Referring to FIG. 1, the GFCI of the present invention includes the following circuits:

a power circuit C001 composed at least of a neutral line N, a live line L, and a breaker switch SK1 series-connected to the neutral line N and the live line L;

a test circuit C002 series-connected to the power circuit C001 and composed at least of a test resistor Rs and a test push-button switch SK2 series-connected together;

a work indicator circuit C003 series-connected to the power circuit C001 and composed at least of a resistor R13 and a light-emitting diode (LED) light series-connected together;

a leakage detection circuit C004 series-connected to the power circuit C001 and composed at least of a leakage detection transformer L3, a capacitor C6, and a capacitor C7;

a neutral-line ground fault detection circuit C005 series-connected to the power circuit C001 and composed at least of a neutral-line ground fault detection transformer L4, a capacitor C8, and a capacitor C9, wherein a resistor R11 and a resistor R12 are series-connected between the leakage detection circuit C004 and the neutral-line ground fault detection circuit C005;

a silicon-controlled-rectifier (SCR) trigger circuit C006 composed at least of a capacitor C5, an SCR, and a test push-button trigger switch SK3; and an integrated circuit (IC) C007 which is electrically connected to the leakage detection circuit C004 and the neutral-line ground fault detection circuit C005 in order to receive respectively therefrom a leakage fault signal and a ground fault signal, and which is also electrically connected to the SCR trigger circuit C006 in order to send thereto a shaped leakage fault trigger signal and a shaped ground fault trigger signal.

The circuitry of the GFCI further includes a dual-coil switch-closing circuit parallel-connected to the power circuit C001, wherein the dual-coil switch-closing circuit includes a first switch-closing circuit CL01 and a second switch-closing circuit CL02.

The first switch-closing circuit CL01 is composed of a diode D1, a resistor R2, a capacitor C1, a coil L1, a triode Q1, a resistor R5, a resistor R6, a resistor R7, a resistor R8, a capacitor C3, and a capacitor C10. The resistor R8, the capacitor C3, and the capacitor C10 mainly serve a filtering and voltage stabilizing function.

The second switch-closing circuit CL02 is parallel-connected to the first switch-closing circuit CL01 and is composed of a rectifier diode D2, a resistor R1, a capacitor C2, a coil L2, a triode Q2, a resistor R9, a resistor R10, a diode D3, and a capacitor C4.

In the first switch-closing circuit CL01 and the second switch-closing circuit CL02, the resistor R2 and the resistor R5 are parallel-connected to each other and series-connected to the diode D1;

the coil L1 and the triode Q1 are series-connected to each other and parallel-connected to the capacitor C1, and this parallel-connected unit is series-connected to the resistor R2;

the resistor R6 and the capacitor C10 are parallel-connected to each other and series-connected to the resistor R5;

the trigger switch SK3, the capacitor C4, and the resistor R7 are parallel-connected to one another and series-connected to the resistor R6;

the resistor R8, the capacitor C3, and the triode Q1 are parallel-connected to one another and series-connected to the resistor R7;

the resistor R1 is series-connected to the diode D2/M7;

the coil L2 and the triode Q2 are series-connected to each other and series-connected to the resistor R1;

the triode Q2 and the resistor R10 are parallel-connected to each other and series-connected to the resistor R9;

the resistor R9 and the diode D3 are parallel-connected to each other and series-connected to the capacitor C4; and the coils L1 and L2 have the same current direction in order to jointly generate a switch-closing electromagnetic force immediately after they are supplied with electricity.

Once the diode D1 rectifies the current running therethrough, at least the following closed loops may be formed within the first switch-closing circuit CL01 and the second switch-closing circuit CL02:

a first closed loop composed of the resistor R2 and the capacitor C1 (this closed loop will not be formed when the capacitor C1 is fully charged and therefore does not allow passage of current);

a second closed loop composed of the resistor R2, the coil L1, the triode Q1, the resistor R5, the resistor R6, the resistor R7, and the triode Q1 and serving to supply electricity to the coil L1 in order for the coil L1 to close the breaker switch SK1;

a third closed loop composed of the resistor R5 and the capacitor C10 (this closed loop will not be formed when the capacitor C10 is fully charged and therefore does not allow passage of current);

a fourth closed loop composed of the resistor R5, the resistor R6, and the trigger switch SK3, wherein the trigger switch SK3 remains open when there is no circuit fault or when the GFCI is supplied with electricity and in normal operation;

a fifth closed loop composed of the resistor R5, the resistor R6, the resistor R7, and the resistor R8;

a sixth closed loop composed of the resistor R5, the resistor R6, the resistor R7, and the capacitor C3 (this closed loop will not be formed when the capacitor C3 is fully charged and therefore does not allow passage of current);

a seventh closed loop composed of the resistor R5, the resistor R6, the capacitor C4, and the diode D3 (this closed loop will not be formed when the capacitor C4 is fully charged and therefore does not allow passage of current);

an eighth closed loop composed of the resistor R5, the resistor R6, the capacitor C4, the resistor R9, and the resistor R10 (this closed loop will not be formed when the capacitor C4 is fully charged and therefore does not allow passage of current); and a ninth closed loop composed of the resistor R5 and the resistor R6 in the first switch-closing circuit CL01; the capacitor C4, the resistor R9, and the triode Q2 in the second switch-closing circuit CL02; and the resistor R1, the coil L2, and the triode Q2 in the second switch-closing circuit CL02 (when the capacitor C4 is fully charged and therefore does not allow passage of current, this closed loop will not be formed, and consequently the coil L2 will not be supplied with electricity).

Once the diode D2 rectifies the current running therethrough, at least the following closed loops may be formed:

a tenth closed loop composed of the resistor R1 and the capacitor C2 (this closed loop will not be formed when the capacitor C2 is fully charged and therefore does not allow passage of current); and an eleventh closed loop composed of the resistor R1, the coil L2, and the triode Q2 in the second switch-closing circuit CL02; the resistor R5 and the resistor R6 in the first switch-closing circuit CL01; and the capacitor C4, the resistor R9, and the triode Q2 in the second switch-closing circuit CL02 and serving to supply electricity to the coil L2 in order for the coil L2 to close the breaker switch SK1 (this closed loop will not be formed when the capacitor C4 is fully charged and therefore does not allow passage of current).

When the capacitors C1, C2, C3, C4, and C10 are fully charged, only the second closed loop and the fifth closed loop are formed, in which state:

the coil L1 is supplied with electricity and continues generating an electromagnetic field to keep the breaker switch SK1 closed, and the capacitor C4 does not allow current to pass therethrough such that the triode Q2 is turned off and the coil L1 is out of electricity and unable to close the breaker switch SK1 by electromagnetic attraction.

When one of the leakage detection circuit C004 and the neutral-line ground fault detection circuit C005 detects a circuit fault, the one detecting the circuit fault sends the fault signal to the IC C007 immediately. The IC C007 shapes the fault signal received and sends the resulting trigger signal to the SCR trigger circuit C006. In consequence, the trigger switch SK3 is triggered to close, causing the voltage value of the resistor R7 to approach zero rapidly. The triode Q1 is turned off as a result, rendering the coil L1 out of electricity and unable to close the breaker switch SK1 by electromagnetic attraction. The power circuit C001 in this state is in the OFF position, meaning the load is cut off from the power supply.

The working principle of the GFCI is described below with continued reference to FIG. 1:

In this GFCI, the solenoid relay controlling the breaker switch SK1 is a joint control mechanism consisting of the coils L1 and L2 and capable of providing a strong attraction force for closing the breaker switch. The coil L1 is supplied with electricity via the second closed loop, and the coil L2, via both the ninth and the eleventh closed loops.

When the voltage of the power supply is zero, the working voltage of the circuits in the GFCI is zero, too. In this state, no current flows through the coil L1 or the coil L2, and the GFCI is in the OFF state, with the breaker switch SK1 open to cut off the connection between the power supply and the load.

When the voltage of the power supply reaches a predetermined value (typically about 80% of the normal supply voltage value), current flows through the coils L1 and L2 in the same direction, and in an instant, the two coils jointly generate an electromagnetic force that rapidly moves the moving contact of the breaker switch SK1 to the stationary contact. Consequently, the GFCI is shifted to the ON state, with the power supply supplying electricity to the load.

After the breaker switch SK1 in the GFCI is automatically closed, the capacitor C4 in the ninth or the eleventh closed loop is rapidly charged to the full via the diode D1 and then stops the passage of current. As a result, the triode Q2 is turned off, and the coil L2 is out of electricity and unable to close the breaker switch SK1 by electromagnetic attraction. At this moment, only the coil L1 is supplied with electricity, and the coil L1 keeps generating an electromagnetic field to maintain the breaker switch SK1 in the closed state. The maintaining voltage of the coil L1 is as low as 15 V, which demonstrates the advantageous energy-saving feature of the GFCI.

As soon as the leakage detection transformer L3 in the leakage detection circuit C004 or the neutral-line ground fault detection transformer L4 in the neutral-line ground fault detection circuit C005 detects a circuit fault, the transformer L3 or L4 which has detected the circuit fault sends the fault signal to the IC C007. The fault signal is shaped by the IC C007 into a trigger signal, which is then sent to the SCR in the SCR trigger circuit C006 to trigger, or close, the trigger switch SK3. Once the trigger switch SK3 is closed, the voltage value of the resistor R7 approaches zero rapidly, so no current flows to the triode Q1, meaning the triode Q1 is in the cut-off state. Now that the triode Q1 is turned off, the coil L1 is out of electricity and is unable to close the breaker switch SK1 by electromagnetic attraction. Under the elastic force of the spring in the breaker switch SK1, therefore, the moving contact of the breaker switch SK1 separates from the stationary contact instantly, shifting the GFCI to the OFF state, in which the power supply stops supplying electricity to the load to prevent damage attributable to the fault current in the GFCI.

Once the circuit fault is cleared, the operator can press the reset push-button of the GFCI to short-circuit the SCR, thereby stopping current from passing through the SCR. Thus, the trigger switch SK3, which has been triggered to close by the SCR, is turned from the turned-on state to the cut-off state. Even after the reset push-button is subsequently released, the trigger switch SK3 will stay in the cut-off state as long as the SCR does not send out the trigger signal. While the trigger switch SK3 is in the cut-off state, no current flows through the trigger switch SK3, so the voltage value of the resistor R7 is restored at once. Accordingly, current runs to the triode Q1 to turn it on. The current also flows through the coil L1 such that the coil L1 generates an electromagnetic field to close the breaker switch SK1 by electromagnetic attraction. Moreover, as the trigger switch SK3 enters the cut-off state from the turned-on state, the capacitor C4, which has fully discharged through the resistors R9 and R10 while the circuit was cut off from the power supply, begins to be charged and allows passage of current. The triode Q2 is thus turned on again, and the coil L2 generates a transient magnetic force due to the current passing therethrough. This magnetic force and the magnetic force generated by the coil L1 jointly form a strong switch-closing force that closes the breaker switch SK1 by electromagnetic attraction again, and by doing so, the GFCI reconnects the power supply to the load. Once the capacitor C4 is fully charged, the triode Q2 returns from the turned-on state to the cut-off state such that the coil L2 is once more out of electricity and unable to close the breaker switch SK1 by electromagnetic attraction. Now, again, only the coil L1 is supplied with electricity and continues generating an electromagnetic force to keep the breaker switch SK1 closed.

When the GFCI is used for the first time, the indicator light of the GFCI will be lit upon connection between the pins of the GFCI and the socket of the power supply, indicating that the GFCI is outputting electricity. When the test push-button of the GFCI is pressed, the indicator light goes out, indicating that the GFCI is not outputting electricity. By pressing the reset push-button, the indicator light will be lit again, indicating that the GFCI is supplied with and outputting electricity and in normal operation.

The advantages, as well as the principle and major features, of the present invention have been shown and described above. As would be understood by a person of ordinary skill in the art, the present invention is not to be limited by the disclosed embodiments; the embodiments and the description serve only to elucidate the principle of the invention. The present invention can be modified and improved in many ways without departing from the spirit and scope of the invention. All such modifications and improvements should fall within the scope of patent protection sought by the applicant. The scope of patent protection sought by the applicant is defined by the appended claims and includes their equivalents.

What is claimed is:
1. An energy-saving ground-fault circuit interrupter (GFCI), comprising:
   a power circuit composed at least of a neutral line (N), a live line (L), and a breaker switch (SK1) series-connected to the neutral line (N) and the live line (L);
   a test circuit connected to the power circuit and composed at least of a test resistor (Rs) and a test push-button switch (SK2) series-connected together;
   a work indicator circuit connected to the power circuit and composed at least of a thirteenth resistor (R13) and a light-emitting diode (LED) light series-connected together;
   a leakage detection circuit magnetically coupled to the power circuit and composed at least of a leakage detection transformer (L3), a sixth capacitor (C6), and a seventh capacitor (C7);
   a neutral-line ground fault detection circuit magnetically coupled to the power circuit and composed at least of a neutral-line ground fault detection transformer (L4), an eighth capacitor (C8), and a ninth capacitor (C9);
   a silicon-controlled-rectifier (SCR) trigger circuit composed at least of a fifth capacitor (C5), an SCR, and a trigger switch (SK3); and
   an integrated circuit (IC) which is electrically connected to the leakage detection circuit and the neutral-line ground fault detection circuit in order to receive respectively therefrom a leakage fault signal and a ground fault signal, and which is also electrically connected to the SCR trigger circuit in order to send thereto a shaped leakage fault trigger signal and a shaped ground fault trigger signal;
   a dual-coil switch-closing circuit parallel-connected to the power circuit, wherein the dual-coil switch-closing circuit comprises:
   a first switch-closing circuit (CL01) composed of a first diode (D1), a second resistor (R2), a first capacitor (C1), a first coil (L1), a first transistor (Q1), a fifth resistor (R5), a sixth resistor (R6), a seventh resistor (R7), an eighth resistor (R8), a third capacitor (C3), and a tenth capacitor (C10); and
   a second switch-closing circuit (CL02) parallel-connected to the first switch-closing circuit (CL01) and composed of a second diode (D2), a first resistor (R1), a second capacitor (C2), a second coil (L2), a second transistor (Q2), a ninth resistor (R9), a tenth resistor (R10), a third diode (D3), and a fourth capacitor (C4);
   wherein the first coil (L1) and the second coil (L2) have a same current direction so as to jointly and instantly generate a switch-closing electromagnetic force when supplied with electricity;

wherein after the first diode (D1) performs current rectification, at least the following are able to be formed:
a first current path composed of the second resistor (R2) and the first capacitor (C1);
a second current path composed of the second resistor (R2), the first coil (L1), and the first transistor (Q1), wherein the fifth resistor (R5), the sixth resistor (R6), and the seventh resistor (R7), bias the first transistor (Q1) into a conductive state to supply electricity to the first coil (L1) in order for the first coil (L1) to close the breaker switch (SK1);
a third closed loop composed of the fifth resistor (R5) and the tenth capacitor (C10);
a fourth current path composed of the fifth resistor (R5), the sixth resistor (R6), and the trigger switch (SK3), wherein the trigger switch (SK3) remains open in the absence of a circuit fault;
a fifth current path composed of the fifth resistor (R5), the sixth resistor (R6), the seventh resistor (R7), and the eighth resistor (R8);
a sixth current path composed of the fifth resistor (R5), the sixth resistor (R6), the seventh resistor (R7), and the third capacitor (C3);
a seventh current path composed of the fifth resistor (R5), the sixth resistor (R6), the fourth capacitor (C4), the ninth resistor (R9), and the tenth resistor (R10); and
after the second diode (D2) performs current rectification, at least the following are able to be formed:
an eighth current path composed of the first resistor (R1) and the second capacitor (C2); and
an eleventh current path composed of the first resistor (R1), the second coil (L2), and the second transistor (Q2) in the second switch-closing circuit (CL02), wherein the fifth resistor (R5) and the sixth resistor (R6) in the first switch-closing circuit (CL01) and the fourth capacitor (C4) and the ninth resistor (R9) in the second switch-closing circuit (CL02) bias the second transistor into a conductive state to supply electricity to the second coil (L2) in order for the second coil (L2) to close the breaker switch (SK1).

2. The energy-saving GFCI of claim 1, wherein when the first capacitor (C1), the second capacitor (C2), the third capacitor (C3), the fourth capacitor (C4), and the tenth capacitor (C10) are fully charged, the first coil (L1) is supplied with electricity and continues generating an electromagnetic field to keep the breaker switch (SK1) closed, whereas the second coil (L2) is out of electricity and unable to close the breaker switch (SK1) by electromagnetic attraction.

3. The energy-saving GFCI of claim 1, wherein when the trigger switch (SK3) is triggered to close, the first coil (L1) is out of electricity and unable to close the breaker switch (SK1) by electromagnetic attraction.

4. The energy-saving GFCI of claim 1, wherein:
the second resistor (R2) and the fifth resistor (R5) are separately connected to the first diode (D1);
the first coil (L1) and the first transistor (Q1) are series-connected to each other and parallel-connected to the first capacitor (C1) to form a parallel-connected unit, which is series-connected to the second resistor (R2);
the sixth resistor (R6) and the tenth capacitor (C10) are connected to each other and connected to the fifth resistor (R5);
the trigger switch (SK3), the fourth capacitor (C4), and the seventh resistor (R7) are connected to one another and connected to the sixth resistor (R6);
the eighth resistor (R8), the third capacitor (C3), and the first transistor (Q1) are parallel-connected to one another and connected to the seventh resistor (R7);
the first resistor (R1) is series-connected to the second diode (D2);
the second coil (L2) and the second transistor (Q2) are series-connected to each other and connected to the first resistor (R1);
the second transistor (Q2) and the tenth resistor (R10) are parallel-connected to each other and connected to the ninth resistor (R9); and
the ninth resistor (R9) and the third diode (D3) are connected to each other and connected to the fourth capacitor (C4).

* * * * *